J. R. DAVIDSON.
HOISTING DEVICE.
APPLICATION FILED OCT. 8, 1912.
1,117,800.
Patented Nov. 17, 1914.
7 SHEETS—SHEET 3.
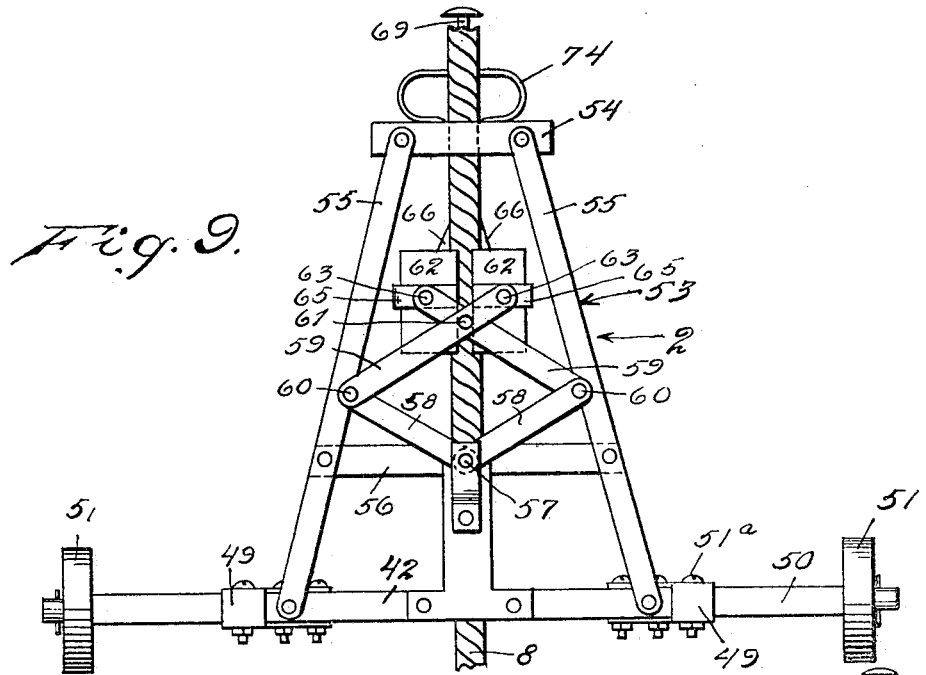
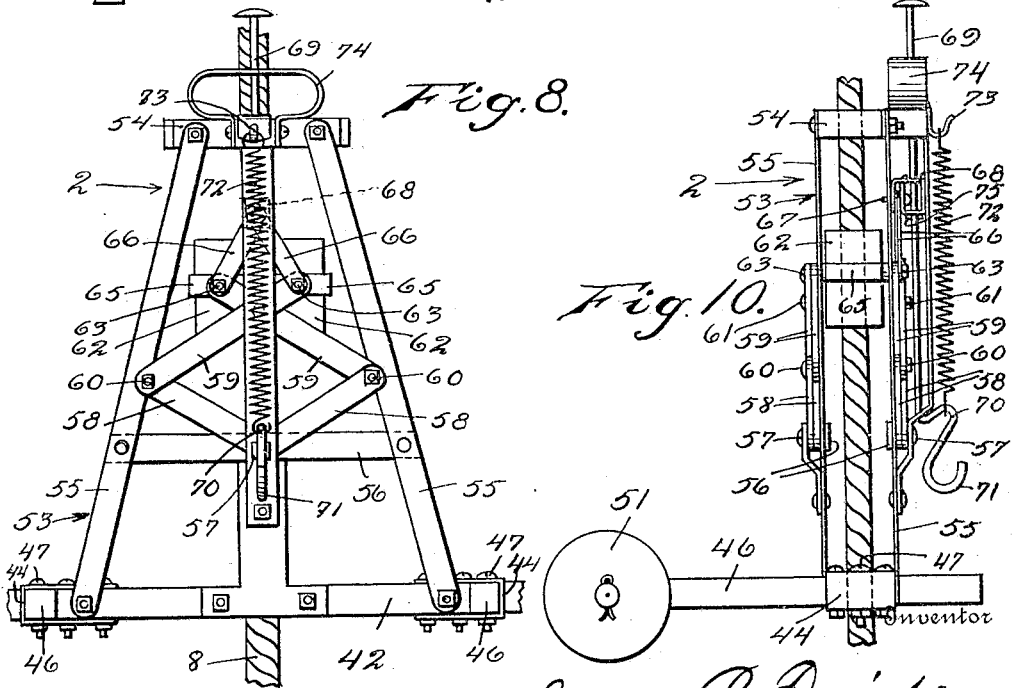

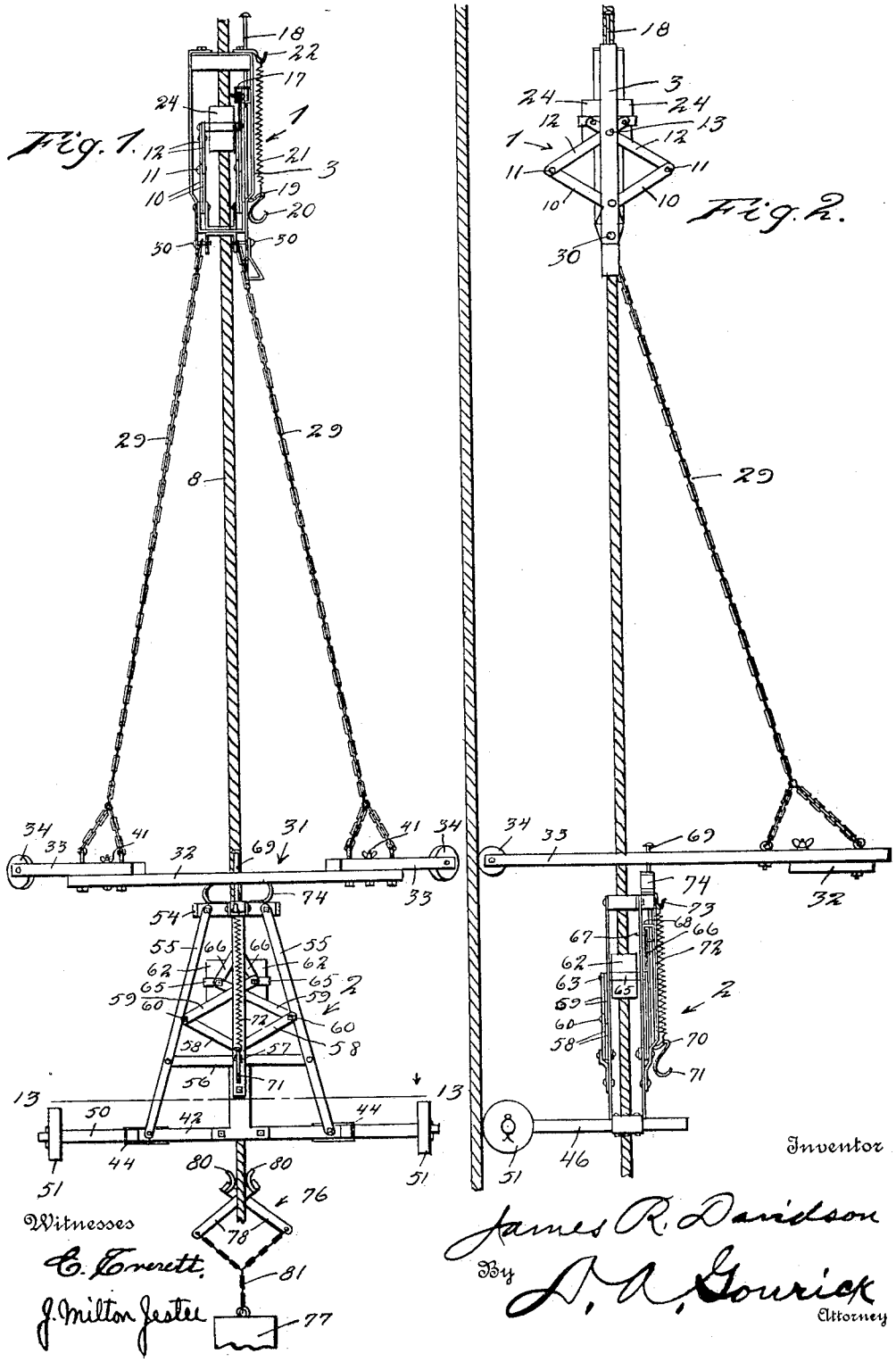

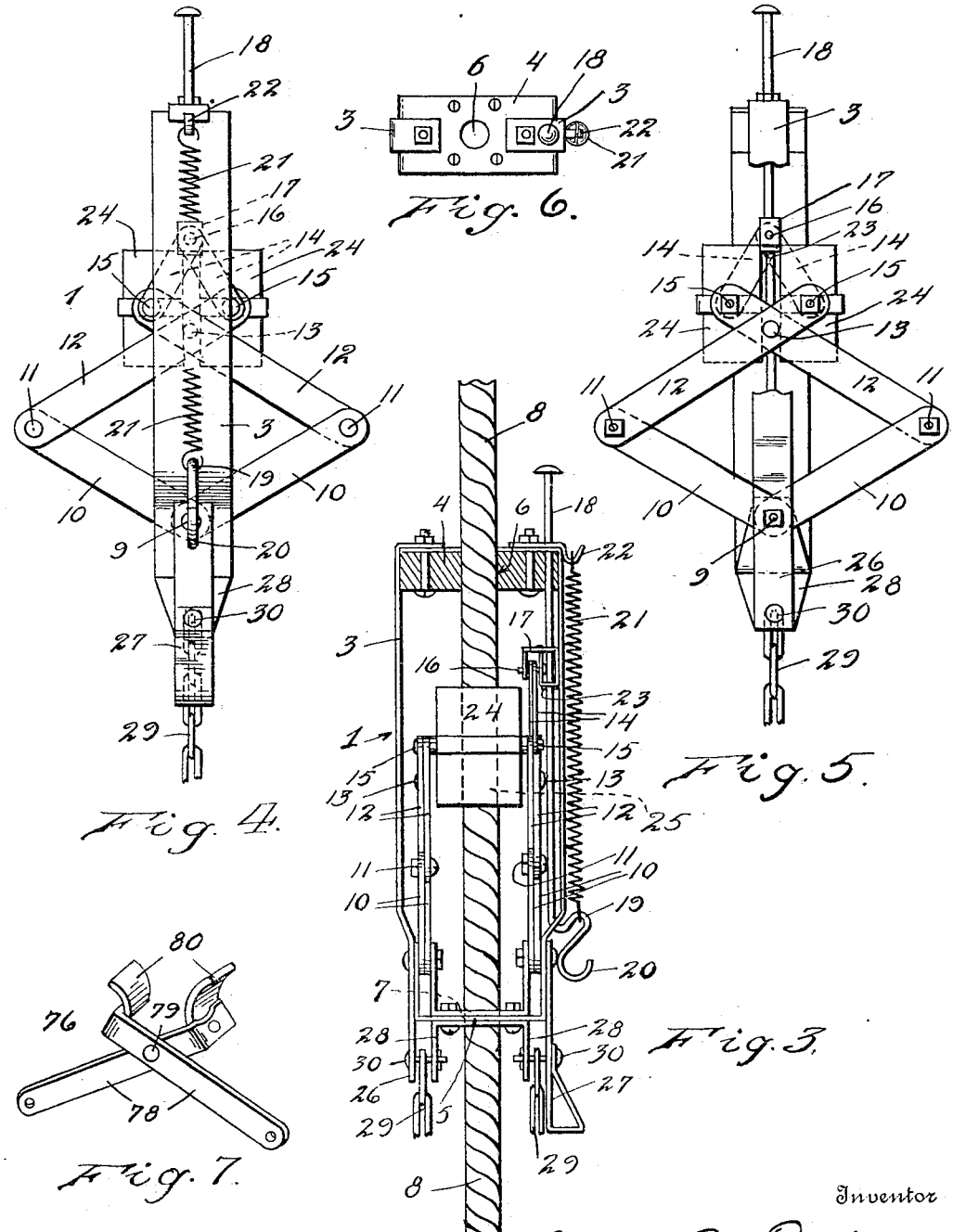

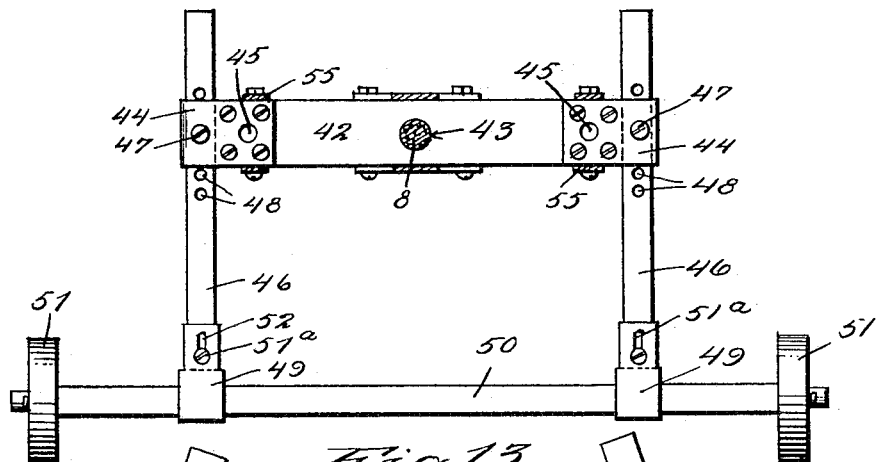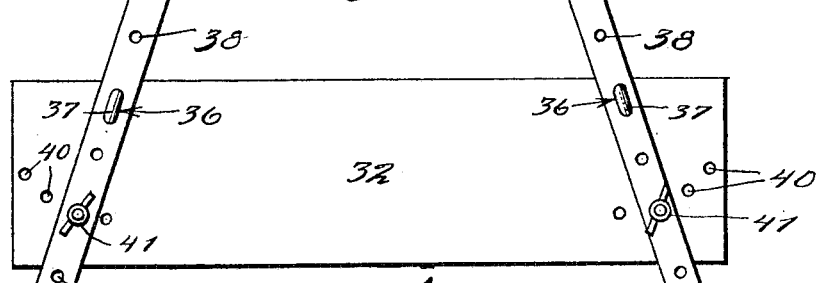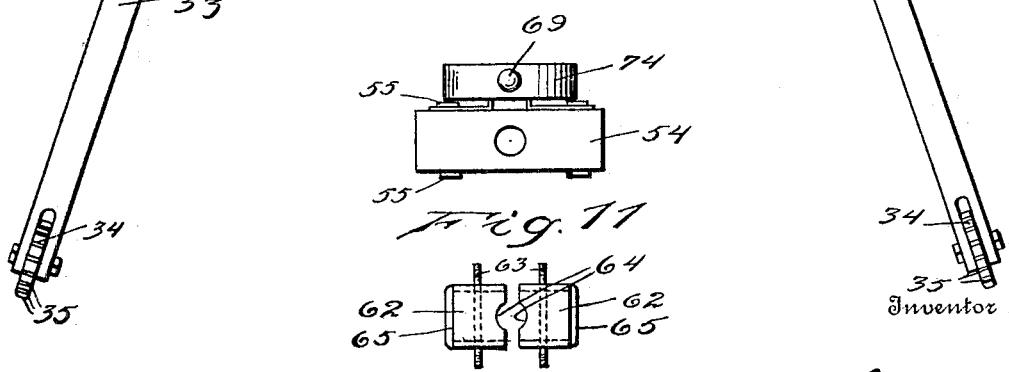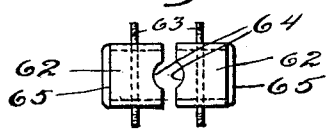

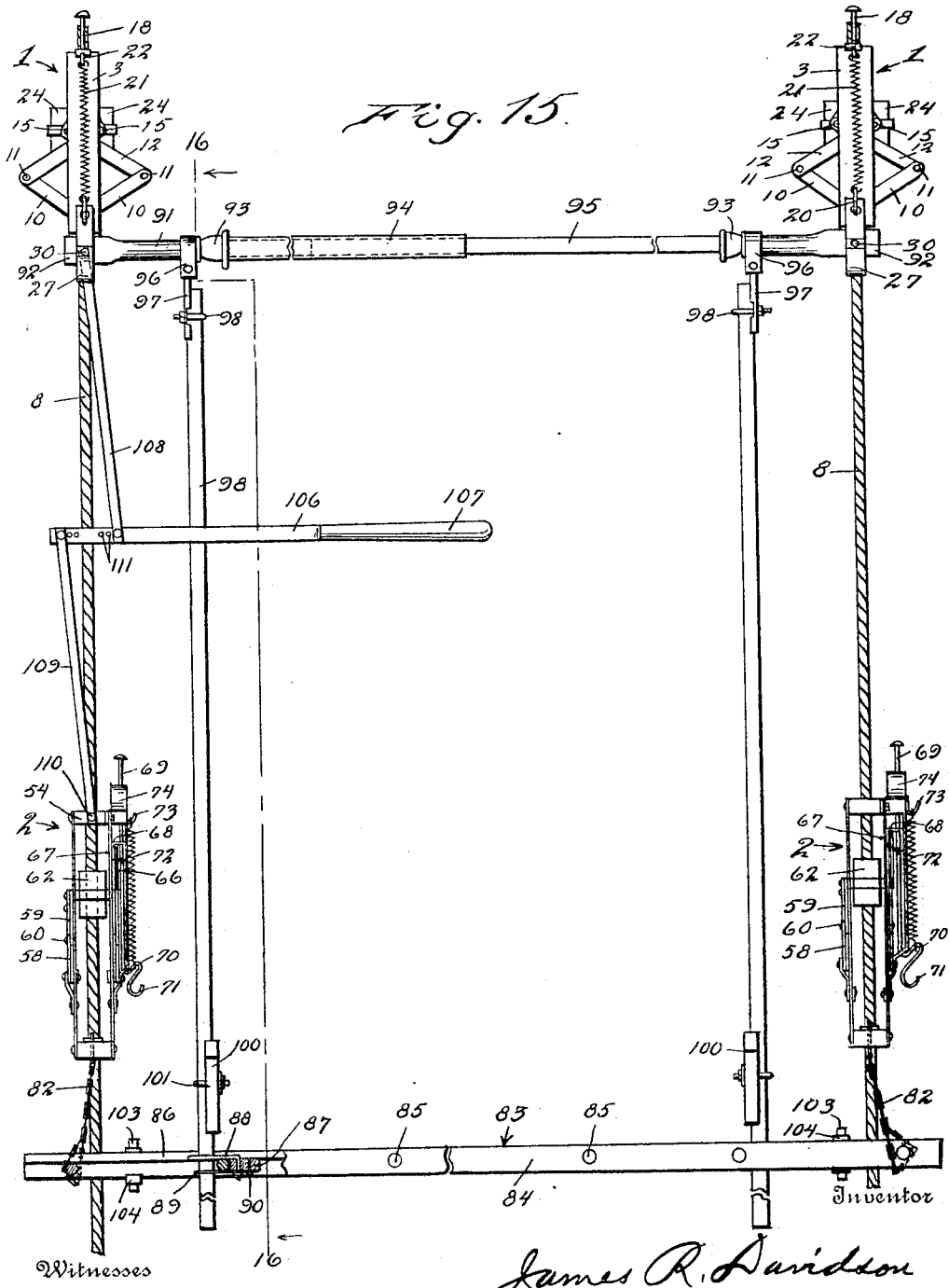

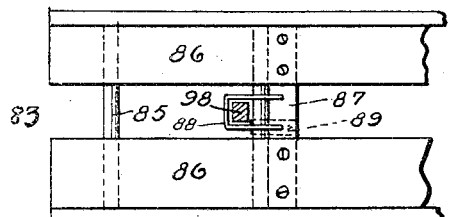
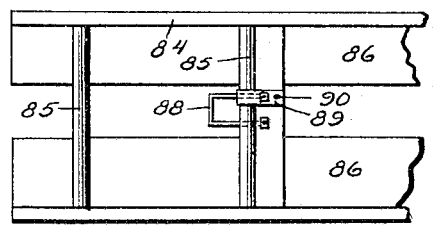
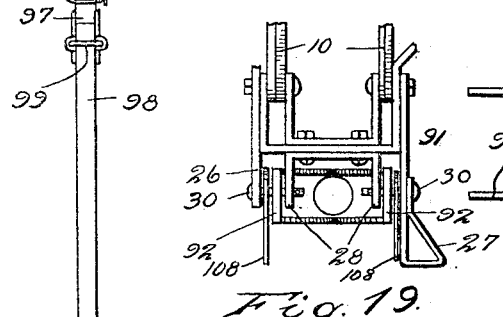

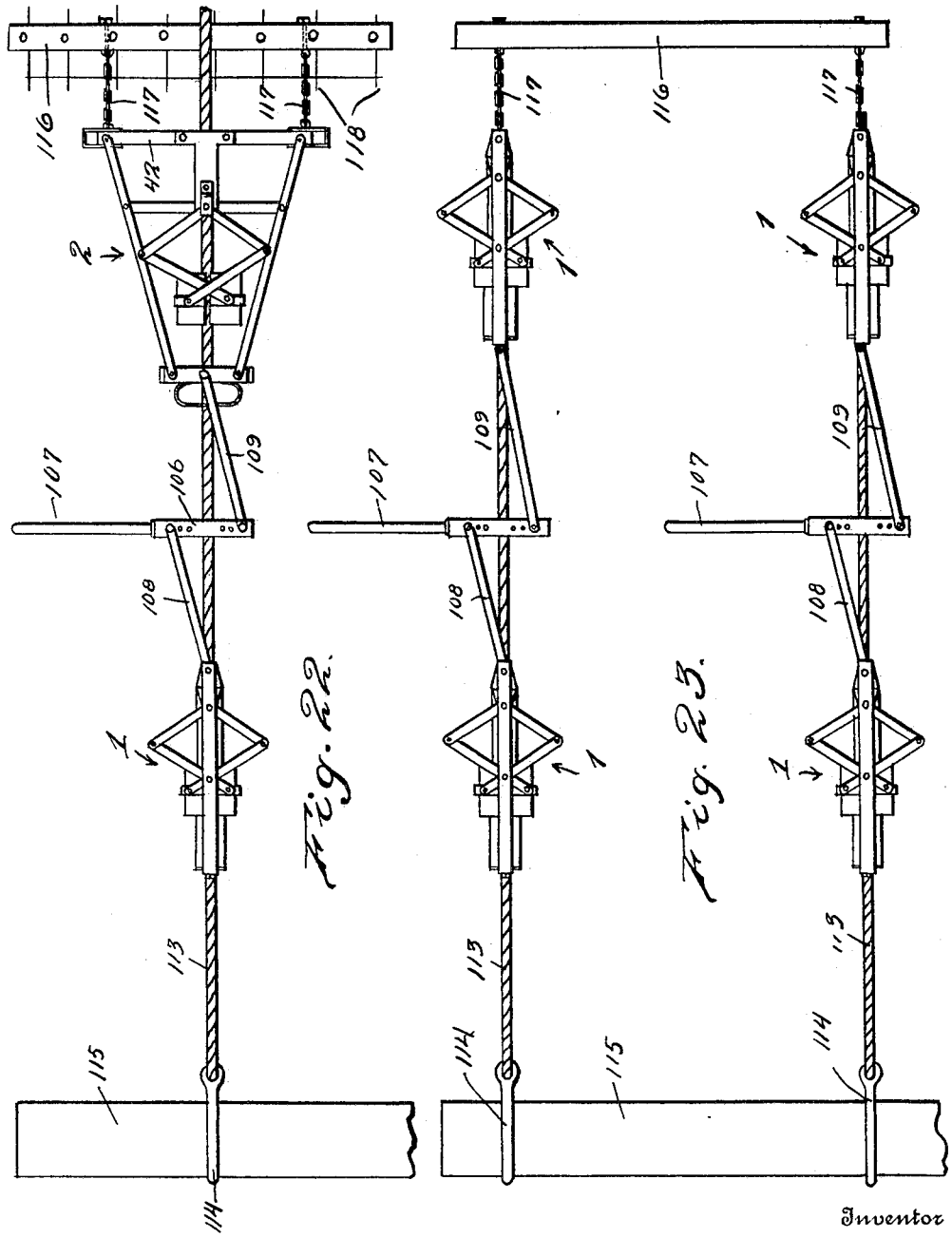

UNITED STATES PATENT OFFICE.

JAMES R. DAVIDSON, OF MOUNT HOPE, WISCONSIN.

HOISTING DEVICE.

1,117,800.     Specification of Letters Patent.     Patented Nov. 17, 1914.

Application filed October 8, 1912. Serial No. 724,549.

*To all whom it may concern:*

Be it known that I, JAMES R. DAVIDSON, a citizen of the United States, residing at Mount Hope, in the county of Grant and State of Wisconsin, have invented certain new and useful Improvements in Hoisting Devices, of which the following is a specification.

My invention relates to hoisting devices and particularly to a scaffold designed for the use of painters, carpenters, window cleaners and others who require means of support while working on elevated structures.

It is well known that the ordinary type of hook scaffold and many others are undesirable on account of their cumbersomeness, expensiveness, and lack of safety. Some types are dependent upon a knot or hook or other similar insecure and uncertain means for maintaining them in their proper positions. Many lives have been lost on account of the insecurity of most forms of scaffold. Others again, though safe, require an enormous amount of rope in order to ascend to any considerable height.

The object of this invention is to provide a novel form of scaffold which is held in place by means of grips upon the rope and which is absolutely incapable of movement of more than two or three feet at one time.

An important object is to provide a device of this character with which only one rope is required, which rope need not be in excess of the height of the building to be worked upon and which is held taut, thus preventing any oscillation of the device.

A further object is to provide a device of this character, the elements of which are also capable of arrangement in such a manner as to provide a double scaffold upon which two men may work with ease.

The most important object of the invention is to provide a positive rope gripping means which clamps the rope tightly until all weight is removed from the device.

Another object is to provide a device which is moved in either an upward or downward direction by means of a step by step movement, which may be varied at the will of the operator.

Still another object is to provide a device of this character equipped with means for regulating and maintaining the distance from the wall of the structure to be worked upon.

Still another object is the provision of a scaffold, which in addition to its utility in working on the sides of the structure may be used as a roof or shingling scaffold.

A further object is to provide a lever whereby the upper and lower elements of the double scaffold may be moved, thus increasing its lifting power.

A still further object is to construct the upper and lower elements in such a manner that when placed in tandem, they may be adapted for use in stretching wire fences.

Other objects and advantages will be made apparent during the course of the following specification.

Referring to the drawings in which like numerals are used to designate corresponding parts throughout the several views: Figure 1 is an elevation of my complete single scaffold in position for ascending the side of a building, Fig. 2 is a side elevation thereof, Fig. 3 is an enlarged front elevation of the upper member of the structure, Fig. 4 is an enlarged side elevation of the same, Fig. 5 is an enlarged elevation of the opposite side of the same, Fig. 6 is a top plan view, Fig. 7 is a perspective view of a clamp used in securing the lower end of the rope, Fig. 8 is an enlarged front elevation of the lower element of the structure, Fig. 9 is a rear elevation of the same, Fig. 10 is a side elevation of the same, Fig. 11 is a top plan view, Fig. 12 is a detail view of the gripping blocks, Fig. 13 is a sectional view on the line 13—13 of Fig. 1, Fig. 14 is a plan view of the seat used with the single scaffold, Fig. 15 is a front elevation of my device adapted for use as a double scaffold, Fig. 16 is a sectional view on the line 16—16 of Fig. 15, Fig. 17 is a top plan view of one end of the platform, Fig. 18 is a bottom plan view of the same end of the platform, Fig. 19 is a fragmentary view of the upper member with the attachment required for the double scaffold, Fig. 20 is a detail view of the arm to which the spacing bar is secured, Fig. 21 is a plan view of the device adapted for use on roofs, Fig. 22 is a view of the upper and lower elements of the single scaffold in use as a fence stretcher, and Fig. 23 is a view of two pairs of the upper elements arranged for use as a wire fence stretcher.

Referring more particularly to the drawings, Figs. 1 and 2 illustrate the device in complete form set up for use as a single scaffold, that is it is adapted to be used by one man. The numerals 1 and 2 designate as a whole, the upper and lower gripping devices which both work on the same principle and contain the same indentical gripping mechanism, the only difference being in the frame-work. The upper member 1 comprises a substantially rectangular frame 3, the upper and lower bars 4 and 5 of which are provided with alined openings 6 and 7 for the reception and passage of a rope 8, which is to be fastened securely upon the building, wall, or roof to be worked upon, and which extends practically to the ground or the base from which the operations are begun. Pivoted upon the frame 3 adjacent its lower end, as shown at 9, are two pair of levers 10 which extend upwardly in an inclined direction and are pivoted as shown at 11 upon upper levers 12 which extend upwardly and are pivotally connected as shown at 13, intermediate of their ends. Levers 14 are pivotally connected as shown at 15, with the extreme upper ends of one pair of the levers 12 and are further pivoted upon a common pin 16 which is held within a bracket 17. The bracket 17 is slidably mounted upon a rod 18 which extends longitudinally of the frame 3 and terminates in a hook 19 and finger piece 20. A coil spring 21 is connected with said hook 19 and a hook 22 formed upon the upper part of the frame 3. A pin or bolt 23 extends through the rod 18 and is in engagement with the lower portion of the bracket 17 thus allowing the rod 18 to be moved downwardly without affecting the position of the bracket 17 and yet maintaining pressure in an upward direction against the bracket 17.

The upper ends of the levers 12 in addition to being connected with the levers 14 are further connected as shown at 15 with a pair of rope gripping blocks 24 which are reinforced by bands of iron or other metal and which are provided upon their inner faces with grooves 25. It is preferable to form these gripping blocks of wood so as not to cause too great wear on the rope.

The sides of the frame 3 extend below the transverse bar 5, as shown at 26 and 27, the side 27 being formed as a hand grip. The U-shaped bracket 28 is connected with the bar 5 and extends downwardly parallel with and spaced from the arms 26 and 27. Chains 29 are connected with bolts 30 or the like which extend through the arms 26 and 28 and 27 and 28 and are prevented from accidental withdrawal by means of cotter pins, nuts, or the like. The chains 29 extend downwardly for connection with an adjustable seat structure designated as a whole by the numeral 31.

The seat structure comprises a main board 32 upon which are secured spaced arms 33 in the forward ends of which are journaled rollers 34, which may be provided with teeth 35. The arms 33 are pivotally connected with the board 32 adjacent the rear edge thereof by means of bolts 36 which are provided upon their upper ends with eyes 37. The arms 33 are provided with a series of apertures 38 within which eye-bolts 39 are secured. The chains 29 are bifurcated at their lower ends and are connected with these eye-bolts 36 and 39. The board 32 is provided with apertures 40 arranged on the arc of a circle concentric with the bolts 36. It will be noted that the arms 33 being pivoted to the board 32 by means of the bolts 36 may be swung in a parallel or more or less divergent position and maintained by means of bolts 41. The board 32 may be adjusted longitudinally of the arms 33 by inserting the bolts 36, 39 and 41 through any of the openings 38.

The lower member 2 of the device is disposed below the seat structure 31 and comprises a base 42 provided with an opening 43 for the passage of the rope 8. Upon the ends of the base 42 are secured U-shaped brackets 44 through which are formed openings 45 registering with openings in the base 42. Bars 46 pass through the brackets 44 and are held in position by means of bolts 47 which pass through any desired opening 48 in the bars 46. Upon one end of each of the bars 46 is secured a U-shaped bracket 49 through which passes a transverse bar 50 having rollers 51 journaled upon its ends. The brackets 49 are longitudinally adjustable on the bars 46 by means of bolts 51$^a$ and slots 52.

Connected with the base 42 is a framework 53 comprising an apertured top plate 54, side bars 55, and braces 56. Pivotally connected with the frame 53 as shown at 57 are pairs of levers 58 extending upward and connected with pairs of levers 59 as shown at 60. The pivoted levers 59 are pivotally connected with each other intermediate of their ends, as shown at 61. The extreme ends of the levers 59 are pivotally connected with rope gripping blocks 62 as shown at 63. The blocks 62 are provided with grooves 64 upon their inner opposing faces and are reinforced by means of bands 65 of any suitable metal. One pair of the levers 59 is pivotally connected with a pair of levers 66 which extend upwardly and are pivoted upon a common pin 67 held within a bracket 68. The bracket 68 is slidably mounted upon a rod 69 slidable within the frame and terminating at its lower end in a hook 70 and finger piece 71. A coil spring 72 is connected with said hook 70 and a hook 73 upon the upper end of the device. A handle 74 is secured upon the top plate 54 and is apertured for the reception of the rod 69. A pin 75 extends through the rod 69 and is in engagement with the lower side of the bracket 68. It will thus be seen that the tension of the spring 72 holds the bracket 68 in an elevated position and that the rod 69 may be moved downwardly without affecting the position of the bracket 68.

It will be noted that the rope passes through the plate 54 between the gripping blocks 62 and through the base 42 to a position somewhere near the base of operations. It is desirable to hold the rope 8 comparatively taut. To this end I apply gripping tongs 76 to the rope and suspend a weight 77 from said tongs. These tongs comprise L-shaped bars 78 pivotally connected intermediate of their ends, as shown at 79, and provided upon the L-shaped extensions with grips 80 of leather or other suitable material. The other ends of the bars 78 are apertured for connection with the chain 81 from which the weight 77 is suspended.

The operation of the device is as follows: Assuming that the device is near the ground and in a position for ascending, the operator seats himself upon the seat structure 31 with his feet resting upon the base 42 of the lower gripping member 2. In order to ascend the operator rises to his feet in order to relieve all weight from the seat 31 and then grasping the upper gripping member 1 with his hand, moves it upwardly until the seat 31 is elevated to as great a height as is practicable for use as a seat. The operator then resumes his position upon the seat and merely draws his knees upward as far as possible thus raising the lower member 2 on account of the engagement of his feet with the cross bar 56. This operation is repeated until a desired elevation is reached. It will be noted that the rollers 34 and 51 are in engagement with the side of the building to be worked upon and thus space the device properly from the building in order that the operator's knees will be safely out of the way. The position of the board 32 of the seat structure may be varied by means of the adjusting bolts 36 and 41 in order to bring the board 32 closer or farther from the building in order to adapt it for use by different individuals. The divergence of the arms 33 may be varied so that the rollers 35 may straddle a previously painted strip or to bring the board 32 closer to the wall. Either of the upper or lower gripping members 1 and 2 is capable of sustaining the weight of the operator, owing to the action of the spring, gripping blocks and levers. At all times the pressure of the spring 72 by forcing the bracket 68 upwardly causes an upward pull upon the gripping blocks 62 by means of the levers 66. It will be readily seen that when the operator rests his entire weight upon the cross bar 42 there is a tendency to move the device downward which tends to cause an upward movement of the levers 58 which causes the upper ends of the levers 59 to come together, thus exerting pressure upon the rope 8. The greater the weight upon the bar 42 the greater the pressure of the blocks 62 upon the rope.

When the weight is removed from the seat 31 the upper member 1 may be pushed upward with very slight effort as upward movement of the frame 3 draws the levers 10 and 13 toward each other thus releasing the blocks 24 from engagement with the rope 8. When the member 1 has been elevated to the desired position it is released, whereupon the spring 21 elevates the bracket 17 which in turn raises levers 14, thus bringing the blocks 24 into engagement with the rope. When the operator rests his weight upon the seat 31 the pressure of the blocks 24 on the rope is increased by the action of the levers 10 and 12. The lower member 2 may then be elevated as the upward movement of the operator's feet will bring the levers 58 and 59 closer together, thus moving the blocks 62 outwardly and out of engagement with the rope. When weight is again thrown upon the bar 42 the block 62 will grip the rope as before. It will be apparent that the members 1 and 2 will maintain their position at any point on the rope as the weight of the frame work is sufficient to make the blocks grip firmly. In order to descend, the rope, assuming that the operator is in position upon the seat, it is necessary to grip the handle 74 on the member 2 at the same time pressing downward upon the rod 69, thus releasing the blocks 62 from engagement with the rope 8. The operator then moves the member 2 downwardly as far as he can reach and then stands upon the bar 42, thus removing the weight from the seat 31. He then reaches up and placing his palm against the grip 27 pulls down on rod 18 by means of the finger piece 20. This releases the blocks 24 so that the member 1 may be moved downwardly until the operator may again seat himself. He then lowers the member 2 and the whole cycle of operation is gone through until the position upon the rope is reached.

At all times it is absolutely necessary that the weight be removed from the members 1 and 2 before either of them can be moved downwardly. In both the members 1 and 2 it will be noted that the pins 23 and 75 are disposed below the brackets 17 and 68 that the springs 21 and 72 hold the gripping blocks 24 and 62 in engagement with the rope. Also it will be apparent that downward movement of the rods 18 and 69 does not affect the position of the brackets 17 and 68 positively but merely releases the spring tension upon the brackets and therefore the blocks. Grasping the handle 74 and pressing upon the rod 69 in the member 2 or pressing upon the grips 27 and pulling on the finger piece 20 in the member 1 is the equivalent of lifting the members and it is this lifting which releases the gripping blocks, allowing either member to be moved downwardly. When the rod 69 is released the spring resumes its tension and the blocks can grip the rope. When this is done it will be noted that it is the absence of spring pressure upon the blocks which allows the gripping blocks to remain disengaged from the rope. When there is weight upon either of the members 1 and 2 it will be obvious that pressing downward upon the rods 18 and 69 will not disengage the gripping blocks since the pins 23 and 75 are below the brackets 17 and 68.

In Figs. 15 to 20 inclusive I have illustrated my device arranged as a double scaffold adapted for the use of two operators. In this form two ropes are provided, upon each of which is arranged an upper and lower gripping member 1 and 2 which are identical in structure with the gripping members illustrated in Figs. 1 and 2. The lower ends of the ropes may be secured by means of the tongs 76 and weights 77 as illustrated in Fig. 1 or by any other suitable means. Suspended from the lower portions of the members 2 by means of chains 82 or the like, is a platform structure 83 which comprises a ladder 84 provided with the usual rungs 85, upon which rest one or more boards 86. The chains 82 may be attached to the platform in any suitable manner but I preferably pass them over the sides of the ladder around one rung and then secure the ends to the chain again. In order to prevent displacement of the boards 86 I provide cleats 87 secured to the boards in any desired manner. Extending through the cleats 87 are bracket members 88 which are U-shaped and which extend over one of the rungs 85 and are held in place on the cleats 87 by nuts or other suitable securing means. It will be noted that the cleats 87 are in proximity to the rungs 85 and thus prevent longitudinal movement of the boards. In order to prevent any upward displacement of the boards I provide a keeper 89 which is pivoted upon one of the arms of the brackets 88. As illustrated in Figs. 15, 16, 17 and 18 the latch member 89 is in engagement with the lower side of the rung 85 and is held in this position by means of a split pin 90 which extends through an opening in the cleat 87. In order to remove the board the pin 90 is removed and the latch 89 is swung into a position at right angles to the one shown, thus allowing the boards to be lifted vertically from the ladder. It will be readily seen that by suspending the platform 83 from the members 2 by means of the chains 82 or the like, the distance of the platform below the members 2 may be regulated as desired.

In order to connect the upper members 1, I provide sleeves 91 having forked ends 92 and socket ends 93. The forked ends 92 are adapted for insertion between the lugs 26 and 28, and 27 and 28 where they are held by means of the pins 30. A pipe 94 is screw-threaded into one of the sockets 93 and telescopes a smaller pipe 95 screw-threaded into the other socket 93, thus connecting the members 1 and yet providing for varying the distance between them. The advantages of employing these sleeves with a socket at one end to receive the connecting pipe or bar, and the other end bifurcated and pivoted to the gripping members 1 instead of simply connecting the members 1 by a bar are several. If the sleeves were not pivoted the level of the bar or scaffold could not be changed without a man at each rope for the reason that if one end of the bar was raised higher than the other end as would be the case if but one rope was worked at a time, and as would be necessary if but one man was doing the working, the members 1 would be thrown off the perpendicular and the ropes become bound. Another advantage of this construction of sleeve is that one man can work the bar up close into a gable end by reason of the pivotal connection with the gripping members 1 and adjust the bar to the necessary or desired width in the sockets, or replace the bar by a shorter bar as preferred. Another advantage is that in transporting my invention from one place to another it is unnecessary to take the bar or bars connecting the gripping members 1 as bars or pipes of a suitable character can usually be easily obtained at place of destination and readily adjusted in the sockets of the sleeves. Upon each of the sleeves 91 is mounted a yoke 96 having a clamping member 97 connected therewith. A stirrup bar 98 is connected with the clamping member 97 by means of a U-shaped bolt 99 and extends downwardly between the boards 86 of the platform 83, and also extends through the bracket 88 which serves as a guide. Mounted upon the stirrup bar 98 is a stirrup 100 which is secured in place by means of a U-shaped clamping bolt 101. In order to form a guide for the platform 83 to hold it into proper spaced relation from a wall, I provide a pair of arms 102 provided at their forward ends with rollers 103. The rear ends of the arms 102 are forked as shown at 104 and are adapted to engage one side of the ladder 84. It will be noted that the forked ends 104 may be spread in order to grip the sides of the ladder after which it is clamped into position by means of a clamping bolt 105. The operation of this form of the device is as follows: Assuming that two operators are standing upon the platform 83 and desire to make an ascent of the structure to be worked upon it is necessary to grasp the pipes 94 and 95 and to exert upward pressure thereon, thus releasing the blocks 24 and elevating the members 1 to the desired height. As soon as the pipes 94 and 95 are released, the blocks will grip the rope 8, thus holding the members 1 in the new position. By this operation the stirrups 100 will be elevated to a position above the platform 83 and as far thereabove as an operator can conveniently step. The operators then stand upon the stirrups 100, thus removing the weight from the platform 83, and grasp the handles 74. The members 2 may then be elevated until the platform 83 approaches closely the lower edge of the stirrups 100. This cycle of operations is repeated until the desired distance along the ropes 8 has been traveled.

The detailed operation of the members 1 and 2 has already been described in the single form of the scaffold.

When the device is used during the building of structures, it is frequently necessary to carry up material having considerable weight. In this case it is preferable to employ leverage in elevating the members 1 and 2. To this end I provide a device illustrated in Fig. 15 and which comprises a bar 106 forked at one end to straddle the rope 8 and stirrup bar 98, and provided at the other end with a handle 107. Pivotally connected with the bar 106 upon one side of the rope is a pair of links 108 which extend upwardly between the lugs 26 and 28, and 27 and 28 where they are held by the pins 30. Upon the opposite side of the rope is pivoted a pair of links 109 which extend downwardly and are pivotally connected with the upper bar 54 of the member 2 as shown at 110. In order to vary the leverage exerted I provide a series of holes 111 in the bar 106. It will be apparent that by connecting the links 108 and 109 with the inner holes 111 the leverage is greatly increased. I have shown this lever device applied on only one side of the scaffold, though of course in practice it would be necessary to provide it on both sides. With this attachment in place, when it is desired to ascend it is merely necessary to move the handle 107 up and down. The upward movement of the handle 107 moves the member 1 by means of the links 108, and the downward movement moves the member 2 upwardly by means of the links 109.

In descending with this form of device the operators stand upon the platform 83 reach upward and place their hands against the grips 27 pulling on the hooks 20 in order to release the blocks 24, to allow the members 1 to descend until the stirrups 100 are in proximity to the platform 83. They then step upon the stirrups 100, grasp the handles 74 pressing upon the rods 69, and move the members 2 downwardly as far as possible. They then resume their position upon the platform 83 and the cycle of operations is repeated until the desired descent has been accomplished. In case the load upon the platform 83 is sufficiently heavy that it could not be held by the operators standing upon the stirrups 100, the lever 106 may be used. In order to descend using this leverage when the handle 107 is moved downward it is necessary to pull the hook 20 downward and when the handle 107 is moved upward it is necessary to press down upon the rod 69. This form of the scaffold though designed especially for the use of two men, may be advantageously used by only one though in this case it is necessary to elevate one side of the device, walk along the platform, and then elevate the other side of the device.

In Fig. 21 I have shown the elements arranged for use as a shingling or roofing scaffold. In this form I use two of the upper members 1. The sleeves 91 instead of being arranged horizontally are allowed to drop into a vertical position and are inserted through holes in a bar of wood 112 from which they are prevented from withdrawing by means of the sockets 93. In using this form of device the operator rests his weight wholly or in part upon the bar 112. When it is desired to move the bar 112 upward he rests his weight upon the roof or sheathing and raises the member 1 to a new position. The descent is accomplished in practically the same manner as has already been described.

In Figs. 22 and 23 I have shown my device adapted for use as a wire stretcher. In this case one end of the rope 113 has attached thereto a hook 114 which engages a post 115 of the fence. In Fig. 22, I illustrate the use of a member 1 and a member 2. A wire clamp 116 of any well known or preferred type is connected with the bar 42 of the member 2 by means of chains 117 or the like. The lever 106, the links 108 and 109 are arranged as in Fig. 15. It will be seen that by moving the lever 106 backward and forward the members 1 and 2 will travel along the rope 113 pulling the wire clamp 116 toward the post 115, thus stretching the wire 118 taut.

In Fig. 23 I show the device used in the same manner only employing four of the members 1. This form operates in exactly the same manner but has the advantage of being adapted for use in stretching wider wire and in stretching either the top or bottom to a greater extent, thus compensating for irregularities in the ground over which the fence is stretched.

In using the scaffold shown in Figs. 1 and 2 for cleaning windows, different length bars 50 may be used so that the rollers 51 will straddle the window to be cleaned.

Having thus described my invention what I claim is:

1. A hoisting device comprising a rope, a pair of gripping members disposed on said rope one above the other, a support secured to the upper gripping member, a support secured to the lower gripping member, arms adjustably secured to the first mentioned support, a roller carrying bar secured to said second mentioned support, and means secured to the free end of said rope to hold it taut.

2. In a device of the character described, the combination of a pair of ropes with a pair of rope gripping members disposed one above the other upon each of said ropes, each of said members comprising a frame, links connected therewith, rope gripping blocks connected with said links, and releasable spring tension on said blocks, means for connecting the upper of said members, depending supports connected with said connecting means, a platform connected with said lower members, and leverage connected with said upper and lower members, said leverage comprising links connected with upper members and a horizontally disposed lever, and links connected with said horizontally disposed lever and said lower members.

3. In a device of the character described, the combination of a pair of ropes with a pair of rope gripping members on each of said ropes and disposed one above the other, longitudinally adjustable means for connecting the upper gripping members, said means comprising pipes secured to said upper gripping members and telescopically secured to each other, and a platform secured to the lower of said gripping members.

4. In a device of the character described, the combination of two ropes with a pair of rope gripping members upon each of said ropes one above the other, the upper gripping member on one of said ropes being connected with the upper gripping member on the other rope by a telescopic device, said telescopic device comprising a pipe telescoping with a smaller pipe and said pipes secured at their outer ends in sleeves secured to said upper gripping members, and a platform connected with the lower gripping members.

5. In a device of the character described, the combination of a pair of ropes with a pair of rope gripping members on each of said ropes and disposed one above the other, longitudinally adjustable means for connecting the upper gripping members, said means comprising pipes secured to said upper gripping members and telescopically secured to each other, supports depending from said connecting means, and a platform connected with said lower gripping members.

6. In a device of the character described, the combination of a pair of ropes with a pair of rope gripping members on each of said ropes and disposed one above the other, longitudinally adjustable means for connecting the upper gripping members, said means comprising pipes secured to said upper gripping members and telescopically secured to each other, bars depending from said connecting means, stirrups upon said bars, and a platform connected with the lower gripping members.

7. In a device of the character described, the combination of a pair of ropes with a pair of rope gripping members on each of said ropes and disposed one above the other, longitudinally adjustable means for connecting the upper gripping members, depending bars connected with said connecting means, stirrups upon said bars, a platform connected with the lower gripping members, arms on said platform, rollers on said arms, links secured at one end to the upper gripping members, handles secured to the lower ends of said links, other links connected at their lower ends with the lower gripping members and at their upper ends to said handles, said links and said handles being adapted to move said gripping members upward and downward.

8. In a device of the character described, the combination of a pair of ropes with a pair of rope gripping members on each of said ropes and disposed one above the other, a sleeve upon each of the upper gripping members, and means for connecting said sleeves with each other, each of said sleeves being provided at one end with a socket, for the reception of said means for connecting said sleeves, and forked at the other end to fit into lugs on said upper gripping members and be therein connected therewith, and a support secured to the lower gripping members.

9. A hoisting device comprising a pair of gripping members adjustably connected together one above the other, a support depending from the upper of said gripping members and the lower gripping member adapted to serve as a support for said first gripping member, and the grip of either of said members adapted to be released when all the weight is upon the other gripping member.

10. A device of the character described comprising a plurality of ropes, a pair of gripping members disposed one above the other upon each of said ropes, a sleeve or socket secured to each of said upper gripping members and means for connecting said sockets with each other, stirrups suspended from said connecting means, and platforms secured to the lower gripping members.

In testimony whereof I hereto affix my signature in the presence of two witnesses.

JAMES R. DAVIDSON.

Witnesses:
C. EVERETT,
J. MILTON JESTER.

Copies of this patent may be obtained for five cents each, by addressing the "Commissioner of Patents, Washington, D. C."